United States Patent
Eisenhour (10) Patent No.: US 7,513,439 B2
(45) Date of Patent: Apr. 7, 2009

(54) AUTOMATIC CLIMATE CONTROL SYSTEM FOR VEHICLE

(75) Inventor: Ronald S. Eisenhour, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 612 days.

(21) Appl. No.: 11/226,252

(22) Filed: Sep. 15, 2005

(65) Prior Publication Data

US 2007/0056301 A1    Mar. 15, 2007

(51) Int. Cl.
*F24F 7/00* (2006.01)
*B60H 1/00* (2006.01)
*G06F 19/00* (2006.01)

(52) U.S. Cl. .................... 236/49.3; 236/91 C; 165/203; 701/36

(58) Field of Classification Search .................... 62/239, 62/241, 242, 244; 165/41, 42, 43, 44; 236/91 C, 236/91 F
See application file for complete search history.

(56) References Cited

U.S. PATENT DOCUMENTS

| | | | |
|---|---|---|---|
| 4,914,924 A * | 4/1990 | Takahashi | 62/133 |
| 5,031,830 A | 7/1991 | Ogino et al. | |
| 5,186,682 A * | 2/1993 | Iida | 454/75 |
| 5,555,136 A * | 9/1996 | Waldmann et al. | 359/871 |
| 5,626,186 A * | 5/1997 | Honda et al. | 165/43 |
| 5,832,990 A | 11/1998 | Eisenhour | |
| 5,878,809 A * | 3/1999 | Heinle | 165/203 |
| 5,995,889 A * | 11/1999 | Eisenhour | 701/36 |
| 6,173,902 B1 * | 1/2001 | Bauer et al. | 236/49.3 |
| 6,782,945 B1 | 8/2004 | Eisenhour | |

FOREIGN PATENT DOCUMENTS

JP   H05-185826 A   7/1993
JP   H06-96366 B2   11/1994

* cited by examiner

*Primary Examiner*—Chen-Wen Jiang
(74) *Attorney, Agent, or Firm*—Global IP Counselors, LLP (57) ABSTRACT

An automatic climate control system for a vehicle determines actual sun load and a virtual sun load based on prescribed virtual heat load data and the external air temperature. A controller is configured to compare the actual sun load to the virtual sun load to obtain an optimized sun load value, and to control the system based on this optimized sun load value. A method for automatically controlling the climate includes determining measured sun load, determining external air temperature, comparing the measured sun load to the virtual sun load based on prescribed virtual heat load data and the external air temperature to obtain an optimized sun load value, and controlling the system based on the optimized sun load value. The virtual sun load and/or the measured sun load are used to determine the optimized sun load value depending on lighting conditions.

39 Claims, 8 Drawing Sheets

| Room Temp. – Target Temp. | μ |
|---|---|
| <-10°C | 1.0 |
| -5°C | 0.75 |
| 0°C | 0.5 |
| 5°C | 0.25 |
| >10°C | 0 |

AUTOMATIC CLIMATE CONTROL SYSTEM FOR VEHICLE

BACKGROUND OF THE INVENTION

1. Field of the Invention

The present invention generally relates to a climate control system. More specifically, the present invention relates to an automatic climate control system for an automotive vehicle passenger compartment, which utilizes measured sun load and/or virtual sun load depending on daylight conditions in controlling the system in order to optimize performance of the climate control system.

2. Background Information

For many years, automotive vehicles have been provided with climate control systems in order to provide a more comfortable environment for the driver and any passengers. In recent years, climate control systems have been provided that automatically adjust to maintain a desired cabin temperature of the driver and/or passengers.

One type of vehicle automatic climate control system uses ambient temperature sensors and sun load sensors to obtain information on exterior air temperature and solar energy load. The information gathered from the sensors is used in a logic control system to establish airflow data and outlet temperature for the temperature control system in the vehicle passenger compartment. The outside ambient air temperature sensor must be strategically placed so that it is positioned away from heat sources such as the engine of the vehicle. A common location for the ambient temperature sensor is behind the forward radiator grille. This provides fair performance at high vehicle speeds but relatively poorer performance at lower vehicle speeds and/or if the vehicle is traveling in the same direction as surface winds. The sun load sensor(s) are typically located in the upper vehicle dash surface. In this location the sun load sensor(s) may be subjected to shadows (shade), which can cause readings that are inconsistent with the actual solar energy load on the vehicle passenger compartment. Also, when so positioned, the sun load sensor(s) have poor directional sensitivity, i.e., the sensitivity of the sun load sensor(s) vary depending upon the sun angle, which varies seasonally as well as hourly.

U.S. Pat. No. 5,832,990 discloses a climate control system that takes into account airflow, as well as interior temperature, outlet temperature of the system and general comfort parameters while managing the total heat flux. This system uses thermodynamic interaction of the comfort parameters, the interior temperature, the outlet temperature and airflow, as well as other control variables, in accordance with a control logic to improve climate control. However, as in the case of the prior temperature control system, the control system of the '990 patent requires a sun load sensor and an ambient temperature sensor. Thus, this system suffers from some of the same deficiencies as the prior system.

U.S. Pat. No. 5,995,889 discloses a temperature control system that eliminates the need for an external ambient temperature sensor and sun load sensor(s) in order to overcome some of the problems with the prior systems using such sensors. This system regulates outlet temperature and blower speed automatically using a processor with stored control algorithms that rely upon data including virtual ambient temperature and virtual sun load heat flux. In certain driving situations such as when sun load sensors would be shaded, this system performs better than the prior systems utilizing sensors. However, it suffers from other deficiencies. In particular, in certain driving conditions such as when sun load sensors would be in direct sunlight (i.e. when direct sun load impingement on the passenger(s) is present), this system does not work as well as the prior systems utilizing sensors.

In view of the above, it will be apparent to those skilled in the art from this disclosure that there exists a need for an improved automatic climate control system for a vehicle. This invention addresses this need in the art as well as other needs, which will become apparent to those skilled in the art from this disclosure.

SUMMARY OF THE INVENTION

It is an object of the present invention to provide an automatic climate control system for an automotive vehicle, which maintains the desired cabin temperature when a sun sensor receives direct daylight (i.e. direct sunlight during daylight hours).

It is another object of the present invention to provide an automatic climate control system for an automotive vehicle, which maintains the desired cabin temperature even when a sun sensor is shaded such that it does not receive direct daylight (i.e. when it does not receive direct sunlight during daylight hours, but receives indirect daylight).

It is another object of the present invention to provide an automatic climate control system for an automotive vehicle, which maintains the desired cabin temperature when a sun sensor does not receive daylight (i.e. when it is substantially dark or at night time).

The foregoing objects can basically be achieved by providing an automatic climate control system for a vehicle that includes a cabin air regulating structure, a sun load sensor component, an external temperature sensor component and a controller. The cabin air regulating structure is configured to regulate airflow into a passenger compartment of the vehicle. The sun load sensor component is configured to measure actual sun load. The external temperature sensor component is configured to determine external air temperature. The controller is configured to compare the actual (measured) sun load to a virtual sun load based on prescribed virtual heat load data and the external air temperature to obtain an optimized sun load value, and to control the cabin air regulating component based on the optimized sun load value to maintain a desired cabin temperature.

The foregoing objects can also basically be attained by providing a method for automatically controlling the climate in a passenger compartment of a vehicle, which includes determining measured sun load, determining external air temperature, comparing the measured sun load to a virtual sun load based on prescribed virtual heat load data and the external air temperature to obtain an optimized sun load value, and controlling a cabin air regulating structure based on the optimized sun load value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
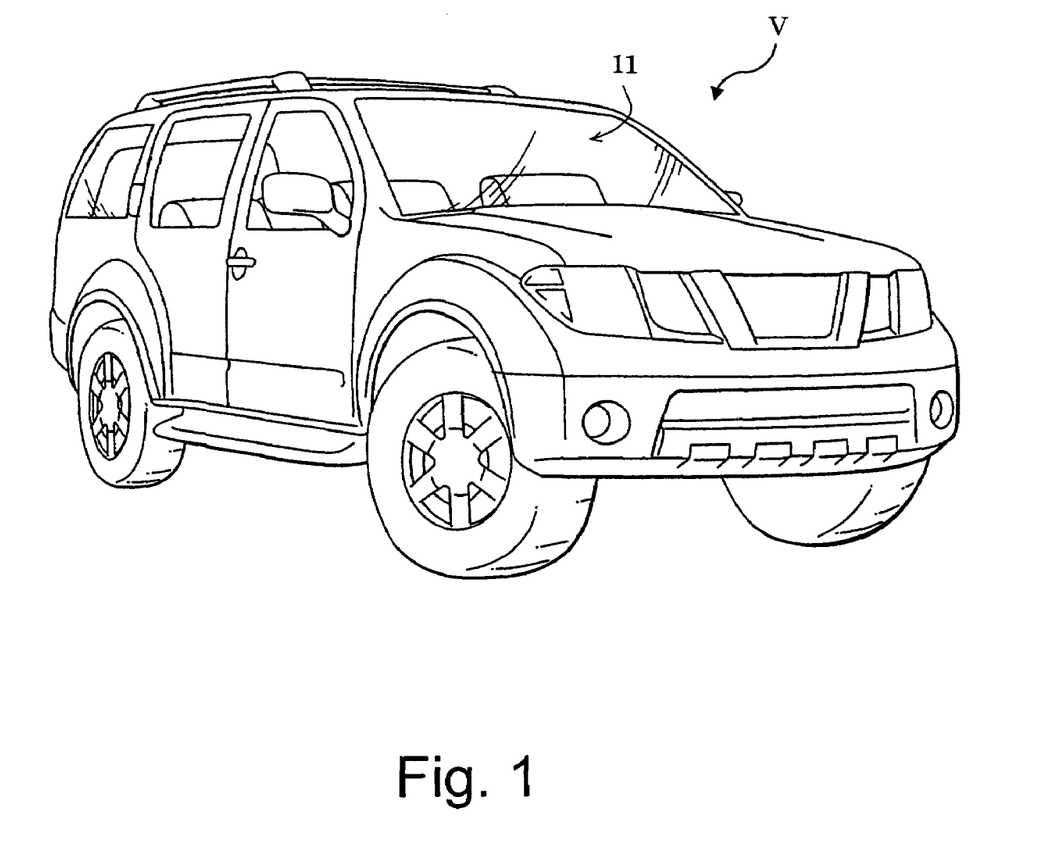
FIG. 1 is a front perspective view of an automotive vehicle equipped with an automatic climate control system in accordance with the present invention.
Figure 2:
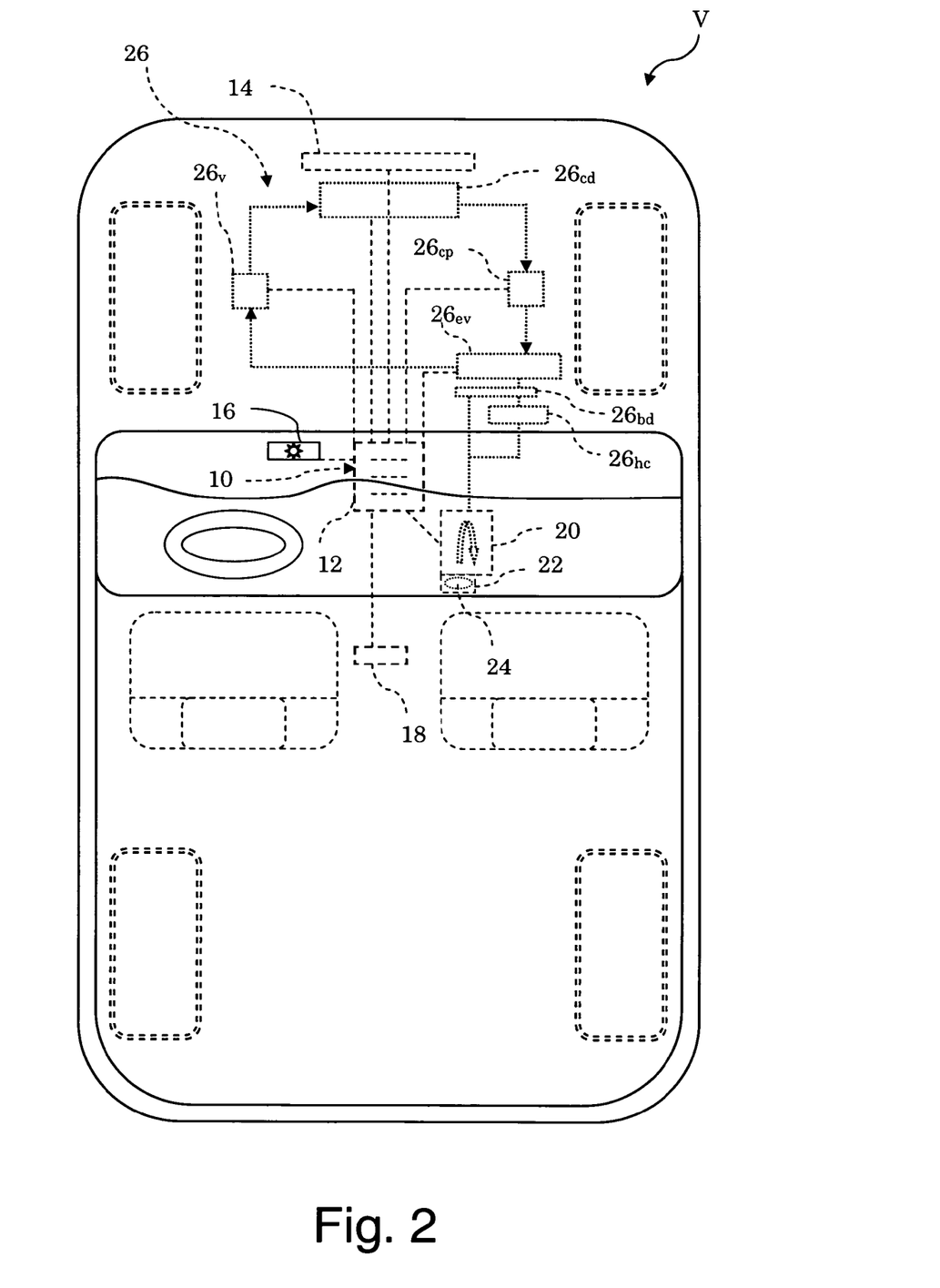
FIG. 2 is a diagrammatic, partial top plan view of the automotive vehicle illustrated in FIG. 1 with the parts of the climate control system schematically illustrated, for a single zone climate control system.
Figure 3:
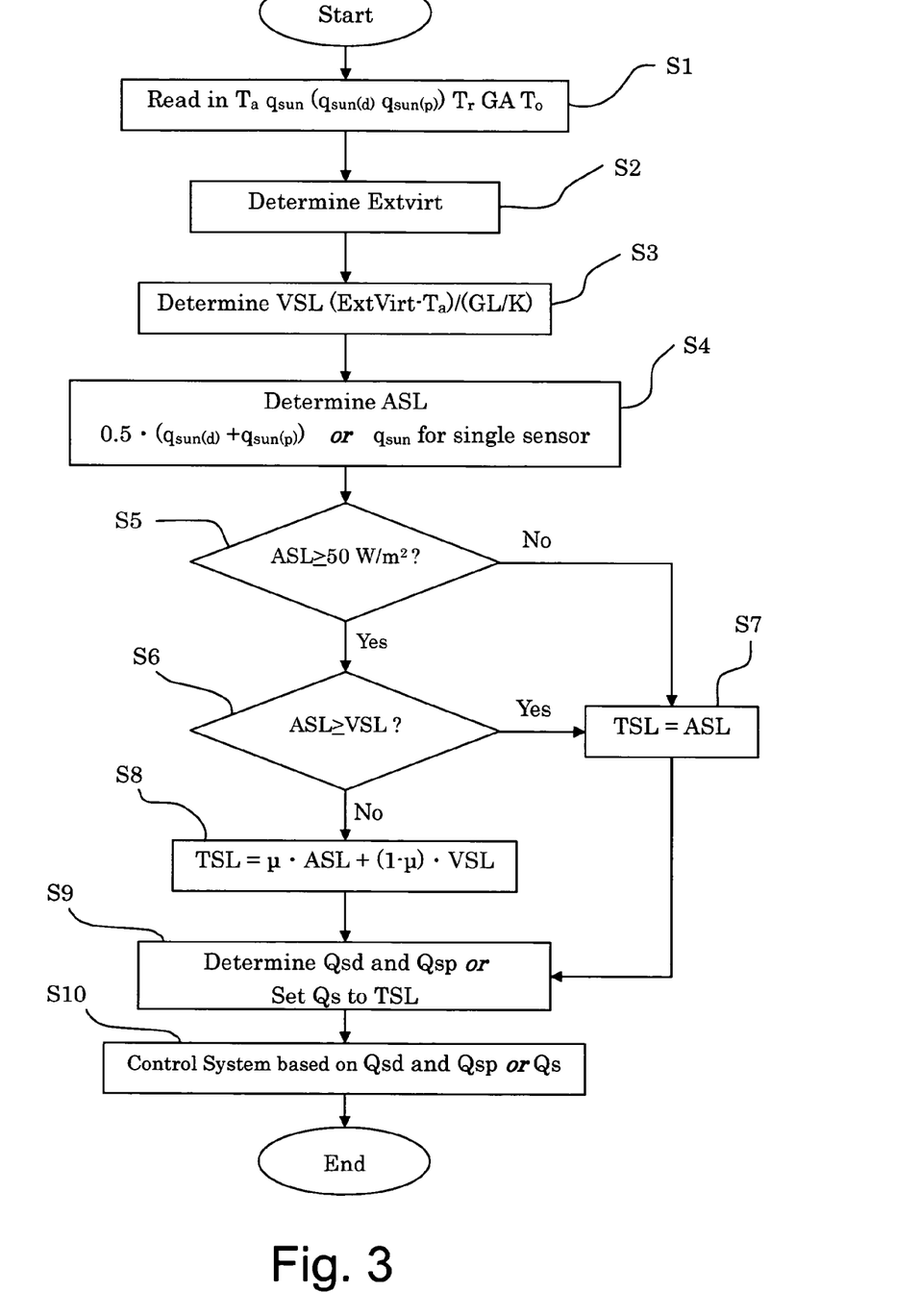
FIG. 3 is flow chart illustrating the control logic carried out by the controller of the present invention.

Referring initially to FIGS. 1-3, a vehicle V with an automatic climate control system 10 used to control the temperature within the passenger compartment 11 is illustrated in accordance with a the present invention. The automatic climate control system 10 of the present invention is designed to optimize passenger comfort (climate) regardless of the driving situation (e.g. at night, at initial start-up, in direct sunlight, in indirect sunlight or shade, etc.). Specifically, the automatic climate control system 10 of the present invention is designed to determine a virtual sun load VSL applied to the vehicle V, detect a measured sun load ASL indicated by sensor(s) applied to the vehicle V, and to compare the virtual sun load VSL and the measured sun load ASL depending on the driving conditions in order to obtain an optimized thermal sun load value TSL. The measured sun load ASL is representative value of the actual sun load. The climate control system 10 then controls the outlet airflow rate and regulates the outlet air temperature based on the optimized sun load value TSL, which is based on the virtual sun load VSL and/or the measured sun load ASL, depending on the driving conditions to optimize performance of the climate control system 10, as explained below. Thus, the comfort of the passenger(s) within the passenger compartment 11 can be optimized.

The automatic climate control system 10 includes both heating and air conditioning components to regulate the temperature in the passenger compartment 11. However, for the sake of simplicity, only the air conditioning components of the automatic climate control system 10 will be described and shown to explain the present invention. The automatic climate control system 10 basically includes a controller 12, an external ambient temperature sensor component 14, a sun load sensor component 16, an internal temperature sensor component 18, a blower component 20, a mass airflow determination component 22, an outlet air temperature sensor 24 and a refrigerant circuit 26 as well as other conventional parts such including a heater core and a blend door system (air blending component), ductwork, valves and the like. The controller 12, the ambient temperature sensor component 14, the sun load sensor component 16, the internal temperature sensor component 18, the blower component 20, the mass airflow determination component 22, the outlet temperature sensor 24, and the refrigerant circuit 26 are basically conventional, except that the controller 12 utilizes the data provided from the various sensors and a control logic in accordance with the present invention in order to optimize performance of the climate control system 10 in a variety of operating conditions, as mentioned above. In particular, the blower component 20 and the refrigerant circuit 26 form parts of a cabin air regulating structure that is controlled by the controller 12 in accordance with the present invention to optimize performance. Accordingly, the controller 12, the ambient temperature sensor component 14, the sun load sensor component 16, the internal temperature sensor component 18, the blower component 20, the mass airflow determination component 22, the outlet temperature sensor 24 and the refrigerant circuit 26 will not be discussed and/or illustrated in detail herein, except as needed to make and use the present invention.

The external ambient temperature sensor component 14 provides external ambient temperature ($T_a$) data for the controller 12, preferably at predetermined intervals (e.g. every 15 seconds). The sun load sensor component 16 provides the measured sun load ASL ($q_{sun}$ for a single zone system or driver and passenger side sun loads $q_{sun(d)}$ and $q_{sun(p)}$ for a dual zone system) data, preferably at predetermined intervals (e.g. every 15 seconds). The sun load ASL is a measured or detected sun load that is measured by the sun load sensor component 16. If the sun load sensor component 16 includes multiple sensor elements (such as with a dual zone climate control system), the measured sun load ASL is the average sun load measured by the different sensor elements (e.g. 0.5 ($q_{sun(d)}$ and $q_{sun(p)}$)). If the sun load sensor component 16 includes a single sensor, ASL simply equals ($q_{sun}$).

The internal temperature sensor component 18 provides internal cabin temperature ($T_r$) data, preferably at predetermined intervals (e.g. every 15 seconds). The mass airflow determination component 22 provides mass airflow (GA) data, preferably at predetermined intervals (e.g. every 15 seconds). The outlet temperature sensor 24 provides outlet temperature ($T_o$) data, preferably at predetermined intervals (e.g. every 15 seconds). The controller 12 uses the data obtained from the various other components of the system 10 as well as stored control algorithms containing prescribed virtual heat load data (based on thermodynamic principles, thermodynamic relationships between the variables and/or empirical data) in order to control the output blower speed (i.e. the mass airflow GA) of the blower component 20 and to regulate the refrigerant circuit 26 in order to control the climate within the passenger compartment 11 in accordance with the present invention.

The mass airflow determination component 22 provides mass airflow (GA) data, as mentioned above. In particular, the mass airflow determination component 22 senses voltage across the blower component 20, which can be converted to mass airflow (GA) based on empirical data stored in the controller 12. Similarly, when it is desired to set the blower component 20 to a certain mass airflow (GA) rate, the controller 12 uses the empirical data to set the blower voltage corresponding to the desired mass airflow rate (GA). This is a relatively conventional way to determine mass airflow (GA) and to control the blower component 20 of the climate control system 10.

Figure 11:
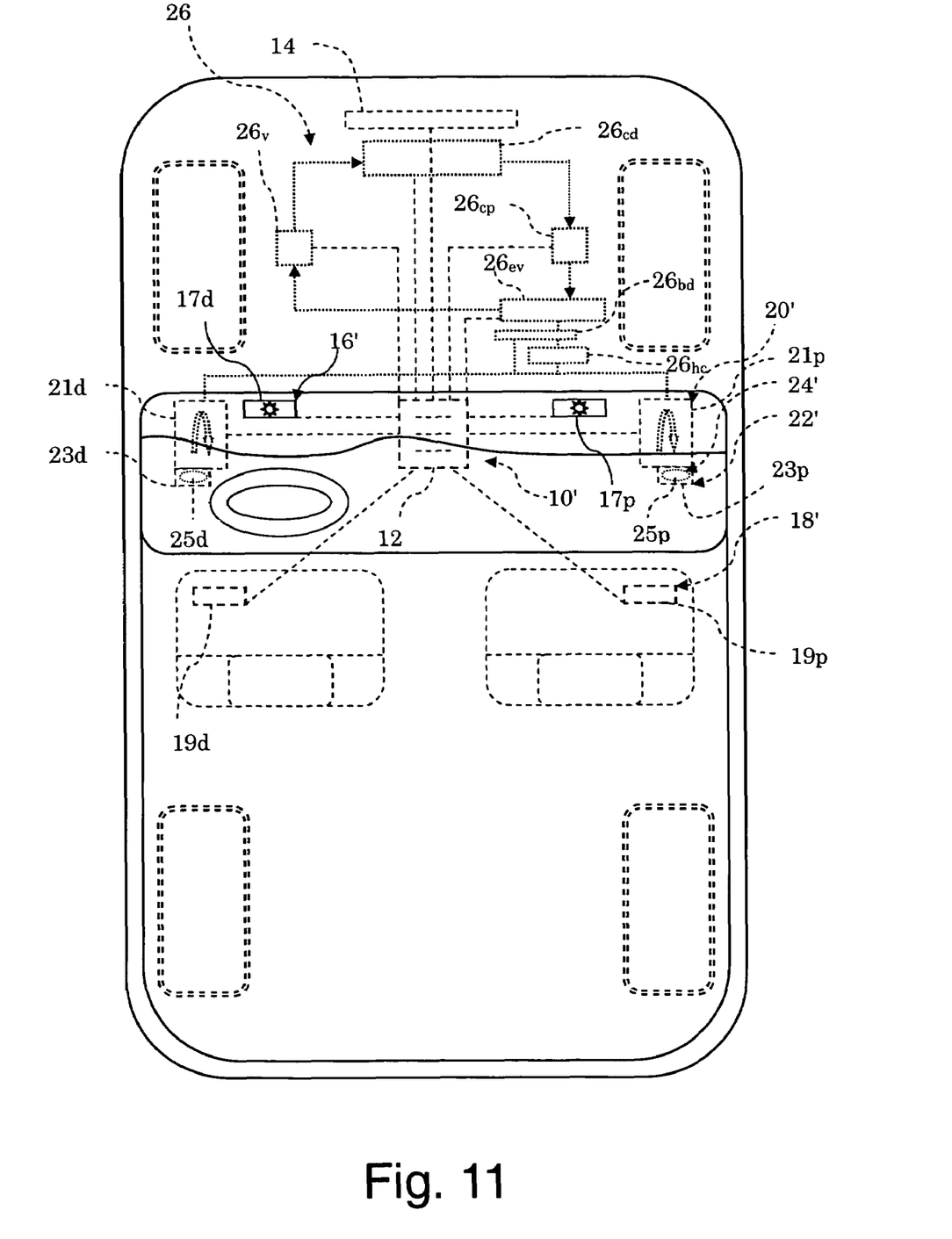
FIG. 11 is a diagrammatic, partial top plan view of the automotive vehicle illustrated in FIG. 1 with the parts of a modified climate control system schematically illustrated, for a dual zone climate control system.

The climate control system 10 can be a single zone climate control system as illustrated in FIG. 2, or a dual zone climate control system as illustrated in FIG. 11 in accordance with the present invention. For the sake of simplicity, the single zone climate control system will initially be explained. In either case, the present invention operates in a very similar manner to U.S. Pat. No. 5,995,889. However, the present invention utilizes the ambient external temperature component 14 and the sun load sensor component 16, which are omitted from the system of the '889 patent, in the control logic illustrated in FIG. 3 to optimize performance of the climate control system 10 of the present invention. The control logic illustrated in FIG. 3 is used in conjunction with the control logic of the '889 patent, as explained below.

The controller 12 of the climate control system 10 is basically conventional, except that the controller (control unit) 12 utilizes the control logic illustrated in FIG. 3. Thus, the controller 12 preferably includes a microcomputer or central processing unit (CPU), input/output circuits (I/O interface), and storage devices such as a ROM (Read Only Memory) device and a RAM (Random Access Memory) device. The microcomputer of the controller 12 is programmed to control the climate control system 10. Specifically, the memory devices store the programming (control logic) as well store control algorithms containing the prescribed heat load data and the processing results (sensor data). The controller 12 is operatively (e.g. electrically) coupled to the ambient temperature sensor component 14, the sun load sensor component 16, the internal temperature sensor component 18, the blower component 20, the mass airflow determination component 22, the outlet temperature sensor 24 and the parts of the refrigerant circuit 26 in a conventional manner. The controller 12 is capable of selectively controlling any of the components of the climate control system 10 in accordance with the control logic. It will be apparent to those skilled in the art from this disclosure that the precise structure and algorithms for the controller 12 can be any combination of hardware and software that will carry out the functions of the present invention. In other words, it will be apparent to those skilled in the art from this disclosure that these components can be any type of structure and/or programming that can be used to carry out the present invention.

The refrigerant circuit 26 basically includes an evaporator $26_{ev}$, a compressor $26_{cp}$ with an electromagnetic clutch, a condenser $26_{cd}$ and an expansion valve or orifice $26_v$ as well as other conventional parts including a heater core $26_{hc}$ and a blend door system $26_{bd}$ (air blending component). Typically, the condenser $26_{cd}$ is located in front of a radiator (not shown) that cools the engine coolant of the engine (not shown), while the blower component 20 is located to pull air across the evaporator $26_{ev}$ to cool/warm the air entering the passenger compartment 11 via the blower component 20. As mentioned above, the controller 12 controls the output blower speed (i.e. the mass airflow GA) of the blower component 20 and regulates the refrigerant circuit 26 in order to control the climate within the passenger compartment 11 in accordance with the present invention. In regulating the temperature of the passenger compartment 11, the blend door system $26_{bd}$ that diverts air around the heater core $26_{hc}$ is controlled by the controller 12 to manage the outlet temperature $T_o$ of the air expelled into the passenger compartment 11 in a conventional manner. These components $26_{ev}$, $26_{cp}$, $26_{cd}$, $26_v$, $26_{hc}$ and $26_{bd}$ are conventional components that are well known in the art. Accordingly, these components will not be discussed or illustrated in detail herein, except as related to the present invention.

Referring still to FIGS. 1-3, the control logic (i.e. of FIG. 3) of the present invention will now be explained in more detail. The control logic of FIG. 3 basically includes a start, ten action blocks or steps S1, S2, S3, S4, S5, S6, S7, S8, S9 and S10, and an end. At the end of the logic, the logic will be restarted (repeated).

In action block S1, the external ambient temperature sensor component 14 provides external ambient temperature ($T_a$) data, the sun load sensor component provides sun load ASL ($q_{sun}$ for a single zone system or driver and passenger side sun loads $q_{sun(d)}$ and $q_{sun(p)}$ for a dual zone system) data indicated by the sensor(s), the internal temperature sensor component 18 provides internal cabin temperature ($T_r$) data, the mass airflow determination component 22 provides mass airflow (GA) data, and the outlet temperature sensor 24 provides outlet temperature ($T_o$) data. The data is sent to the controller, preferably at the same time, in predetermined intervals (e.g. every 15 seconds). Of course, if multiple sun sensor elements are used, the measured sun load ASL will need to be calculated, as explained below.

In action block S2, an Extvirt (estimated external load) is determined. The value of ExtVirt is determined using the control logic of FIG. 4 in accordance with the '889 patent, as described below in more detail. The control logic of FIG. 4 further utilizes the initialization logic and the filter logic of FIGS. 6 and 7, respectively, in accordance with the '889 patent, as also described below in more detail.

In action block S3, the virtual sun load VSL is determined. The virtual sun load VSL is computed using the formula $$VSL = (ExtVirt - T_a)/(GL/K)$$

The virtual sun load is $\geq 0$. GL/K comes from an empirical test of a thoroughly soaked vehicle in an empirical measured sun load ($Q_{sun}$) with the system off. The equation for a vehicle in this condition is disclosed in SAE Paper 960684 and is as follows:

$$0 = K \cdot (T_a - T_r) + GL \cdot Q_{sun}$$

Accordingly, $$GL/K = (T_r - T_a)/Q_{sun}$$

$T_a$=the ambient (external) temperature and $T_r$=the room or cabin temperature. GL is the effective glass area for solar load transmission. K is a conduction/convection heat transfer coefficient between the vehicle passenger compartment and ambient.

In action block S4, the (measured) sun load ASL is determined. For a single zone climate control system, the measured sun load ASL is simply the measured actual sun load $q_{sun}$ obtained from the sun load sensor component 16. In a dual zone system, the measured sun load ASL=0.5 ($q_{sun(d)}$+ $q_{sun(p)}$) or the average measured sun load indicated by the sensors as explained below.

In action block S5, it is determined whether the vehicle V is in a daylight condition or a night time (substantial dark) condition. When the sun load sensor component 16 indicates an ASL ($q_{sun}$) less than 50 W/m$^2$ the sky is considered to be dark (i.e. no daylight is considered to be received). 50 W/m$^2$ is a predetermined threshold value to which the ASL ($q_{sun}$) is compared in action block S5. In the case of modest sun sensor shading such as in overcast conditions or clear sky conditions but shaded by the vehicle (e.g. A-pillar, the roof or wiper) or an outside obstruction such as a building or a mountain, the sun load sensor component 16 generally indicates well over 100 W/m² (sometimes 1000 W/m²) during the daylight hours due to diffuse sunlight or reflected sunlight. The sun load sensor component 16 is most sensitive to infrared light (released by the sun). Thus, it does not react to common artificial light sources such as street lights or car headlights. If the measured sun load ASL is ≧50 W/m² indicating that daylight is being received (i.e. a daylight condition), the control logic proceeds to action block S6. If not, the control logic proceeds to action block S7.

If the measured sun load ASL is not ≧50 W/m² (i.e. it is night time or substantially dark) then the control logic proceeds to action block S7. In action block S7, an optimized thermal sun load TSL value is set to be the measured sun load ASL ($q_{sun}$ for a single zone system or an average of driver and passenger side sun loads $q_{sun(d)}$ and $q_{sun(p)}$ for a dual zone system). The optimized thermal sun load TSL is used in controlling the climate control system 10, as explained below. The virtual sun load VSL is preferably not used (i.e. ignored) in this situation because the value of the virtual sun load VSL is an estimate, which may be erroneously high due to residual heat that dissipates just after nightfall that is being indicated by the thermal estimate.

If the measured sun load ASL is ≧50 W/m² (i.e. it is day time), the control logic has proceeded to action block S6. In action block S6, the measured sun load ASL determined in action block S4 is compared to the virtual sun load VSL determined in action block S3. If the measured sun load ASL is ≧ the virtual sun load VSL, the control logic will proceed to action block S7. If not, the control logic will proceed to action block S8.

If the measured sun load ASL is ≧50 W/m² (action block S5) indicating daylight and if the measured sun load ASL is ≧ the virtual sun load VSL, the control logic has proceeded to action block S7. In action block S7, the optimized thermal sun load TSL value is set to be the measured sun load ASL as mentioned above. The optimized thermal sun load TSL is used in controlling the climate control system 10, as mentioned above and explained below. In this situation, because the sun load sensor component 16 provides actual ($q_{sun}$ for a single zone system or driver and passenger side sun loads $q_{sun(d)}$ and $q_{sun(p)}$ for a dual zone system) data rather than an estimate, the measured sun load ASL is preferably used because it can be more accurate in indicating direct sun impingement on the passenger(s). This situation may arise when direct sunlight is shining on the passenger(s) and the sun load sensor component 16. In such a situation, because the virtual sun load VSL only keeps the target room temperature, the virtual sun load VSL may be subjectively insufficient to deal with the sun's warming of the passengers.

If the measured sun load ASL is ≧50 W/m² (action block S5) indicating daylight and if the virtual sun load VSL is > the measured sun load ASL indicated by the sensor(s), the control logic has proceeded to action block S8. In action block S8, a value for the optimized thermal sun load TSL is computed using the formula $$TSL = \mu \cdot ASL + (1-\mu) \cdot VSL$$

Figure 8:
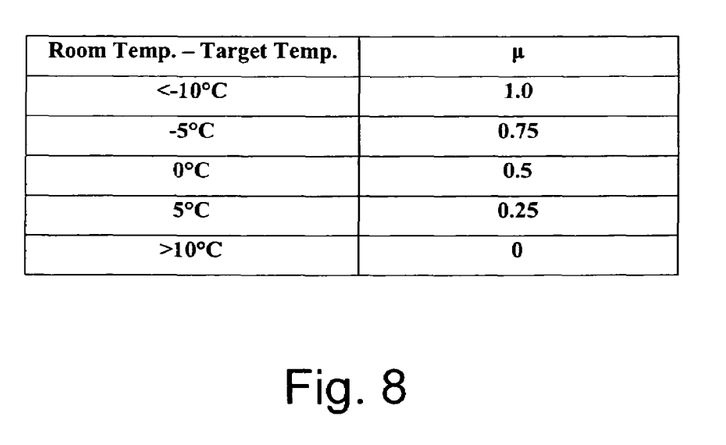
FIG. 8 is a table illustrating values for the weighting factor used for determining thermal sun load when the measured sun load is greater than or equal to the virtual sun load during daylight hours.
Figure 9:
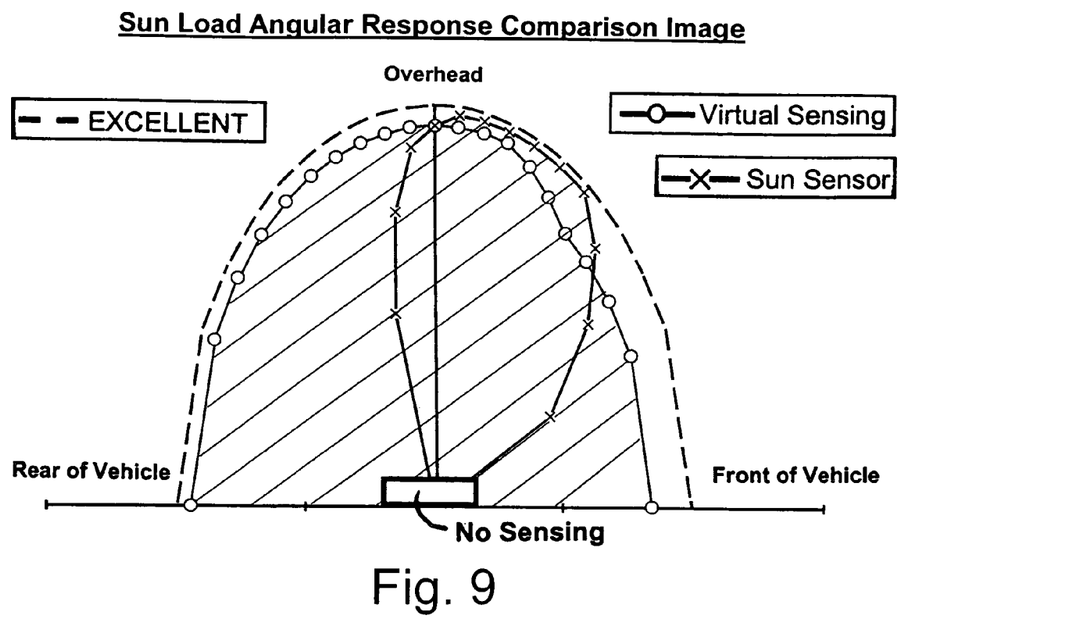
FIG. 9 is a graph illustrating Sun Load Angular Response Comparison for virtual sensing and measured sun sensing relative to excellent performance.
Figure 10:
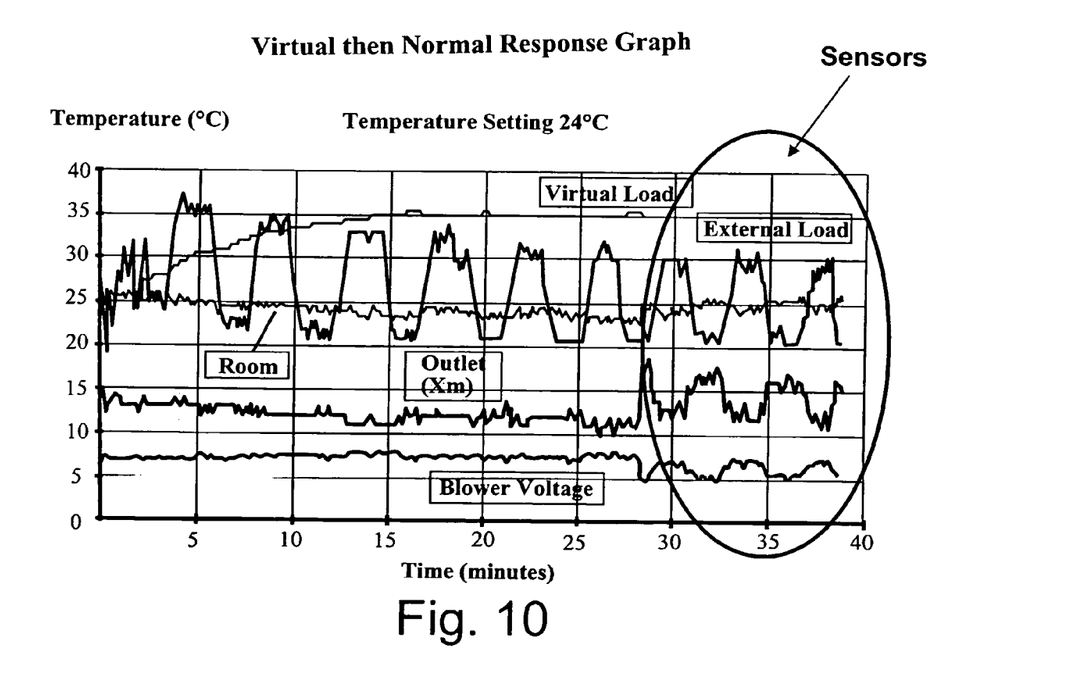
FIG. 10 is a graph illustrating an example of virtual logic control then with sensors.

In this formula, μ is a weighting factor that is obtained from the table illustrated in FIG. 8. Thus, in this situation, weighted values of the virtual sun load VSL and the measured sun load ASL are components of the optimized thermal sun load TSL. As can be understood from FIG. 8, if the room temperature $T_r$ is more than 10° C. warmer than the desired cabin temperature, TSL=VSL such that the optimized thermal sun load TSL will not be reduced by including any weighted factor of the measured sun load ASL (VSL>ASL in this situation). On the other hand, if the desired cabin temperature is more than 10° C. warmer than room temperature $T_r$, TSL=ASL such that the TSL will not be increased by including any weighted factor of the virtual sun load VSL (VSL>ASL in this situation). However, as the difference between the room temperature $T_r$ and the desired temperature get closer to zero, different weighted values of the virtual sun load VSL and the measured sun load ASL will be used to compute the optimized thermal sun load TSL. The values for μ in FIG. 8 can be interpolated by the controller 12 in the ranges between –10° C., –5° C., 0° C., 5° C. and 10° C. The table in FIG. 8 is merely one example of weighting factors μ for climate control system 10. Of course, it will be apparent to those skilled in the art from this disclosure that the values for the weighting factor μ can be modified to increase/decrease the influence of the measured sun load ASL and/or virtual sun load VSL in action block S8, based on empirical testing and/or depending on the type of vehicle and the typical driving conditions for that vehicle. For example, the weighting factors μ (of FIG. 8 used in action block S8) could be set such that the climate control system 10 effectively uses TSL=ASL in heating applications and effectively uses TSL=VSL in cooling applications for a simplified control logic. However, at least some weighted factor of the virtual sun load VSL is preferably utilized in action block S8 in order to improve performance in situations where the virtual sun load VSL is higher than the measured sun load ASL in daylight conditions, possibly due to shading or the like. The optimized thermal sun load TSL is used in controlling the climate control system 10, as mentioned above and explained below.

Action block S7 or S8 is used to determine the optimized thermal sun load TSL, as explained above. In either case, once the optimized thermal sun load TSL is determined, the control logic proceeds to action block S9. In action block S9, the sun load heat flux values or factors (Qs for a single zone system or Qsd and Qsp for a dual zone system) are determined. In a single zone system, the sun load heat flux Qs is simply set to be equal to the optimized thermal sun load TSL. However, in a dual zone system, the driver and passenger Qsd and Qsp need to be calculated. In order to calculate these values, weighting factors SunD and SunP are first determined where SunD=$q_{sun(d)}$–ASL and SunP=$q_{sun(p)}$–ASL. Here, the measured sun load ASL is the average of the driver and passenger side sun loads $q_{sun(d)}$ and $q_{sun(p)}$. These weighting factors SunD and SunP are then applied (added) to the optimized thermal sun load TSL to obtain the driver and passenger sun load factors Qsd and Qsp, respectively. Thus, Qsd=SunD+TSL and Qsp=SunP+TSL. The driver and passenger sun load factors Qsd and Qsp are corrected (adjusted) inputs that replace the sensor inputs and functionally replace the conventional sun sensor inputs to the control logic.

Then, in action block S10, the sun load heat flux values or factors (Qs for a single zone system or Qsd and Qsp for a dual zone system) are used as the sun load inputs to enable the appropriate blower voltage (i.e. blower speed, and thus, GA) to be set using any conventional technique that is well known in the art as well as regulate the outlet temperature by management of the compressor 26$_{cp}$ and/or the blend door system 26$_{bd}$ (air blending component).

Referring now to FIGS. 4-7, the virtual logic from U.S. Pat. No. 5,995,889 used in action block S2 of FIG. 3 will now be explained. Since this virtual logic is now well known, it will not be discussed and/or illustrated in great detail herein. Rather, the virtual logic will only be discussed as needed to make and use the present invention. The symbols used in the discussion below are identified as follows: GL is the effective glass area for solar load transmission. K is a conduction/convection heat transfer coefficient between the vehicle passenger compartment and ambient. Q is the sun load heat flux. $T_a$ is the ambient external temperature. $MC_r$ is the heat capacitance in the vehicle passenger compartment 11. GA is the mass airflow rate (enthalpy rate per degree). $\overline{GA}$ is the average mass airflow. Finally, $T_o$ is the outlet temperature of the air delivered to the passenger compartment 11 by the blower component 20 after passing through the heat exchangers of the climate control system 10.

For the purpose of explaining the thermodynamic principles of ambient temperature and solar load estimation, the start-up condition for the climate control system 10 first will be discussed. During start-up, the energy balance of a soaked vehicle can be estimated in accordance with the following relationship:

$$K \cdot (T_r - T_a) = Q \cdot GL$$

During an energy balanced state, the external estimated conditions (EXTVIRT) equals $$EXTVIRT = T_a + Q \cdot \frac{GL}{K} = T_r$$

The interior airflow must be established to provide information regarding bulk heat transfer to the interior. For this reason, during the first few minutes of operation of the blower component 20, the control system relies on this calculated value of EXTVIRT without adjustment.

Following start-up, the estimate of the external conditions during normal driving can be calculated. This requires a determination of the average outlet temperature, $T_o$, the steady state interior temperature, $T_{rss}$, and the average airflow, $\overline{GA}$. Each of these affects the determination of the external conditions. For stabilized operation during normal driving, the following equation applies:

$$EXTVIRT = \left(1 + \frac{\overline{GA}}{K}\right) \cdot T_{rss} - \left(\frac{\overline{GA}}{K}\right) \cdot T_o$$

If this value for the external condition is substituted in the preceding energy balance equation, the following equation is derived:

$$\overline{GA} \cdot (T_{rss} - T_o) = K \cdot \left(T_a + Q \cdot \frac{GL}{K} - T_{rss}\right)$$

In order to solve this equation, the average airflow and outlet temperature must be known for a given time interval. This will be explained subsequently with respect to FIG. 4.

The term $T_{rss}$ in the foregoing equations represents the average temperature in the vehicle passenger compartment during steady state operation of the interior temperature control system. The airflow represented by the symbol GA can be determined by converting the voltage across the blower component 20 into GA. The voltage value and/or GA can be obtained using an empirical relationship between voltage and blower speed that may be stored in the memory of the microprocessor. In the case of a control system of the kind shown in the '990 patent identified above, the airflow would be determined as part of the heat flux calculation carried out by the processor using the interior temperature control algorithm disclosed in that patent. The determination of the steady state temperature ($T_{rss}$) in the interior of the vehicle passenger compartment 11 of the vehicle V is done by taking periodic samplings of room temperature ($T_r$). This information is used in the estimate of $T_{rss}$ during a given time interval.

This process involves the use of a first order differential equation solution as follows:

$$T_2 = T_{ss} \cdot (1 - e^{-t/\tau}) + T_1 \cdot e^{-t/\tau}$$

where $T_2$=the end of the interval temperature;
$T_{ss}$=the steady state temperature;
$T_1$=the start of interval temperature;
τ=the time constant;
t=the time of the interval; and
e=the natural logarithm base.

The derivative of this solution yields:

$$dT_1 = \lfloor T_{ss} \cdot (1/\tau \cdot e^{-t/\tau}) + T_1 \cdot (-1/\tau \cdot e^{-t/\tau}) \rfloor \cdot dt$$

For a finite interval (duration of Δt):

$$T_2 - T_1 = [T_{ss1} - T_1] \cdot (1/\tau \cdot e^{-(1/\tau)\Delta t}) \cdot \Delta t$$

If all Δt values are equal for "n" small intervals:

$$T_n - T_1 = [\Sigma T_{ssi} - \Sigma T_{i-1}] \cdot (1/\tau \cdot e^{-(1/\tau)\Delta t}) \cdot \Delta t$$

$$T_n - T_1 = n \cdot [T_{(ss)avg} - T_{(i-1)avg}] \cdot (1/\tau \cdot e^{-(1/\tau)\Delta t}) \cdot \Delta t$$

Let, $n \cdot \Delta t = \Delta t_{1-n}$ Thus, $$(T_n - T_1)/\Delta t_{1-n} = [T_{(ss)avg} - T_{(i-1)avg}] \cdot (1/\tau \cdot e^{-(1/\tau)\Delta t})$$

If "Δt/τ" is small, $e^{-(1/\tau)\Delta t}$ is ≅1 (Note: The smallness of Δt is arbitrary) then:

$$(T_n - T_1)/\Delta t_{t-n} = \lfloor T_{(ss)avg} - T_{(i-1)avg} \rfloor \cdot 1/\tau$$

Thus, $$T_{(ss)avg} = T_{(i-1)avg} + \tau \cdot (T_n - T_1)/\Delta t_{1-n}$$

This equation uses simple measurements and a time constant to estimate the steady state condition for a given time interval.

Figure 5:
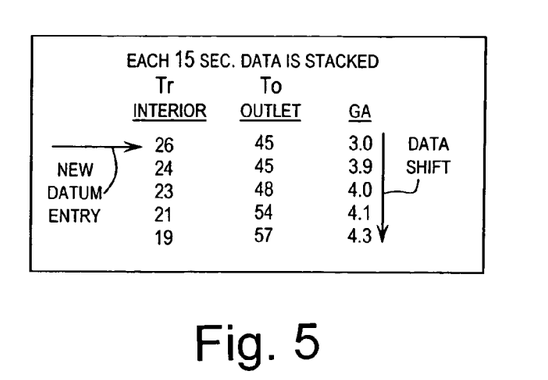
FIG. 5 is a memory stack example of recorded passenger compartment temperature, outlet temperature and airflow over a predetermined measuring time.

In the above equation, $T_{(ss)avg}$ equals the average temperature under steady state conditions in the interior of the vehicle passenger compartment 11. The term $T_{(i-1)avg}$ is the average of the first four temperature values that are stored in memory and stacked as shown in FIG. 5. These are table values that are recorded during calculations at each 15 second interval over a period of one minute. The quantity ($T_n - T_1$) is the change in room temperature over a one minute period. The earliest value for $T_r$ in the example illustrated in FIG. 5 is 19° C. and the recent value for $T_r$ is 26° C. The difference in these values represents an average temperature history over the preceding one minute interval, which is $\Delta t_{1-n}$. The one minute time interval and the 15 second time interval are arbitrary values that are chosen based on engineering judgment and empirical test data. As new data is entered into the top of the stack shown in FIG. 5, the existing data is shifted down as the oldest entry is dropped.

The following equation results from the calculation of the steady state passenger compartment temperature.

$$T_{rss} = T_{riavg} + \Delta T_r \cdot \left[\frac{MC_r}{K + \overline{GA}}\right] / \Delta t$$

In the foregoing equation, $MC_r$ is the effective interior heat capacitance, $\Delta T_r$ is the change in room temperature for a given time interval. $T_{riavg}$ is the average of all but the last room temperature measurement during the time interval. Sampling of the temperature during the time interval (i.e., $\Delta t$) is necessary. A sample rate of one sample for each 15 seconds is used to help determine the value of $T_{rss}$ during the preceding minute ($\Delta t$).

Under unusual conditions where there are unwanted fluctuations in the response to the external conditions, a filtering logic is used periodically to limit the fluctuations. These fluctuations might occur, for example, when a vehicle passenger compartment door is opened and closed or when a window is opened and closed. When an unusual change in heat flux occurs during such transient conditions, the interior temperature sensor component 18 may not correlate correctly with the actual passenger compartment temperature. The following filtering logic is applied periodically to limit the incorrect fluctuations of the response to external conditions.

EXTVIRT(old)=EXTVIRT(old)+M·[EXTVIRT(new)−EXTVIRT(old)]

or

EXTVIRT=EXTVIRT+VIRFIL2·(NewEXT−EXTVIRT)

where: 1>M>0, EXTVIRT(old)=computed EXTVIRT in the previous control loop during steady state operation, and EXTVIRT (old)=computed EXTVIRT at the end of the current control loop during steady state operation.

This filtering logic will be explained with reference to FIG. 7. Under unusual start-up conditions, a special logic is used in the determination of the response to external conditions. If the soak time is very short, the room temperature may not be stabilized (i.e., $T_r$ does not equal $T_a + Q \cdot GL/K$). The EXTVIRT value under these circumstances can be represented by the value stored in memory during the last driving mission. If the vehicle V is cooling to the ambient temperature after a driving mission, stabilization may take a long time. Thus, a temperature offset is taken away from the room temperature and used in the estimate of EXTVIRT. This will be explained with reference to FIG. 6. This effect has an advantage during warm-up performance, even for a completely soaked vehicle. If the vehicle is soaking to a hot condition, the interior temperature sensor component 18 used to measure interior passenger compartment temperature $T_r$ provides the best estimate of temperature of the interior passenger compartment 11. In previously cold conditions without a long soak, the logic assumes that the remembered value for EXTVIRT is the best estimate.

Referring now to the flow chart of FIG. 4, the virtual external load logic now will be described. The control logic (routine) of the processor begins with initialization logic at 30. This will be described with reference to FIG. 6. The processor then enters a filter logic routine at 32, which will be described with reference to FIG. 7. The next step at 34 involves an inquiry as to whether the 15-second interval described previously is over. If it is not over, the routine will inquire at 36 whether the engine is turned off. If the engine is running, the routine then will proceed at the beginning step of the logic where initialization occurs at 30 and a filtering logic is carried out at 32. If the fifteen second interval has terminated, a calculation of airflow takes place at action block 38. This involves a calculation of airflow GA based on voltage, as explained previously. In certain temperature control systems, this can be done, as explained previously, by referring to a functional relationship between blower voltage determined by the driver's selection of blower motor speed and airflow based on empirical test data.

The outlet temperature $T_o$ and the airflow GA data are computed at action block 40 in accordance with the equations described previously. This information then is transferred to a memory stack as shown in FIG. 5. This is done at each 15-second interval. The newest data stacked in the memory, as indicated in FIG. 5, is entered at the top of the stack. The average temperature then is the average of the four most recently stored readings. In an example shown in FIG. 5, the average of initial room temperatures (AvgInit) is the average of 19° C., 21° C., 23° C. and 24° C. The average outlet temperature (Avg Outlet) would be the average of the four most recently stored values 45° C., 45° C., 48° C. and 54° C. The corresponding average airflow $\overline{GA}$ is calculated similarly in cubic meters per minute using the values 3.0, 3.9, 4.0 and 4.1.

The routine then proceeds to action block 42, where the interior heat capacitance is calculated in accordance with the equations described previously. A determination then is made at step 44 to determine whether the engine is running and whether it has been running for at least two minutes, which is an arbitrary time established by test data. If it has not been running for at least two minutes, the routine will proceed to action block 46 where the next 15-second interval is set so that the previously described steps of the routine can be repeated. If the engine still is running as determined at step 36, the routine then will proceed to the beginning, where initialization logic will be confirmed to have been completed. If the engine is off, the external conditions (EXTVIRT) will be stored in memory where it will be made available for the next operating cycle, as shown at 48.

If the inquiry at step 44 is positive, the engine will have been running for at least two minutes. The routine then will proceed directly to action block 50 where the steady state room temperature is calculated. This is done as previously described in accordance with the equation indicated above for $T_{rss}$. The routine then will calculate a new external load at action block 52 in accordance with the relationship NewEXT=(1+$\overline{GA}$/K)·Steady−Average Outlet·$\overline{GA}$/K The filtering calculation then is carried out at action block 54, as will be explained with reference to FIG. 7. This is done in accordance with the equation:

EXTVIRT=EXTVIRT+VIRFIL2·(NewEXT−EXTVIRT)

The value for the filtered virtual load then is stored in memory as shown at action block 48 after the engine is turned off, as confirmed at block 36, and after the next 15-second interval is set as shown at 46. This EXTVIRT value is stored in RAM where it can be used during the next driving mission.

Figure 4:
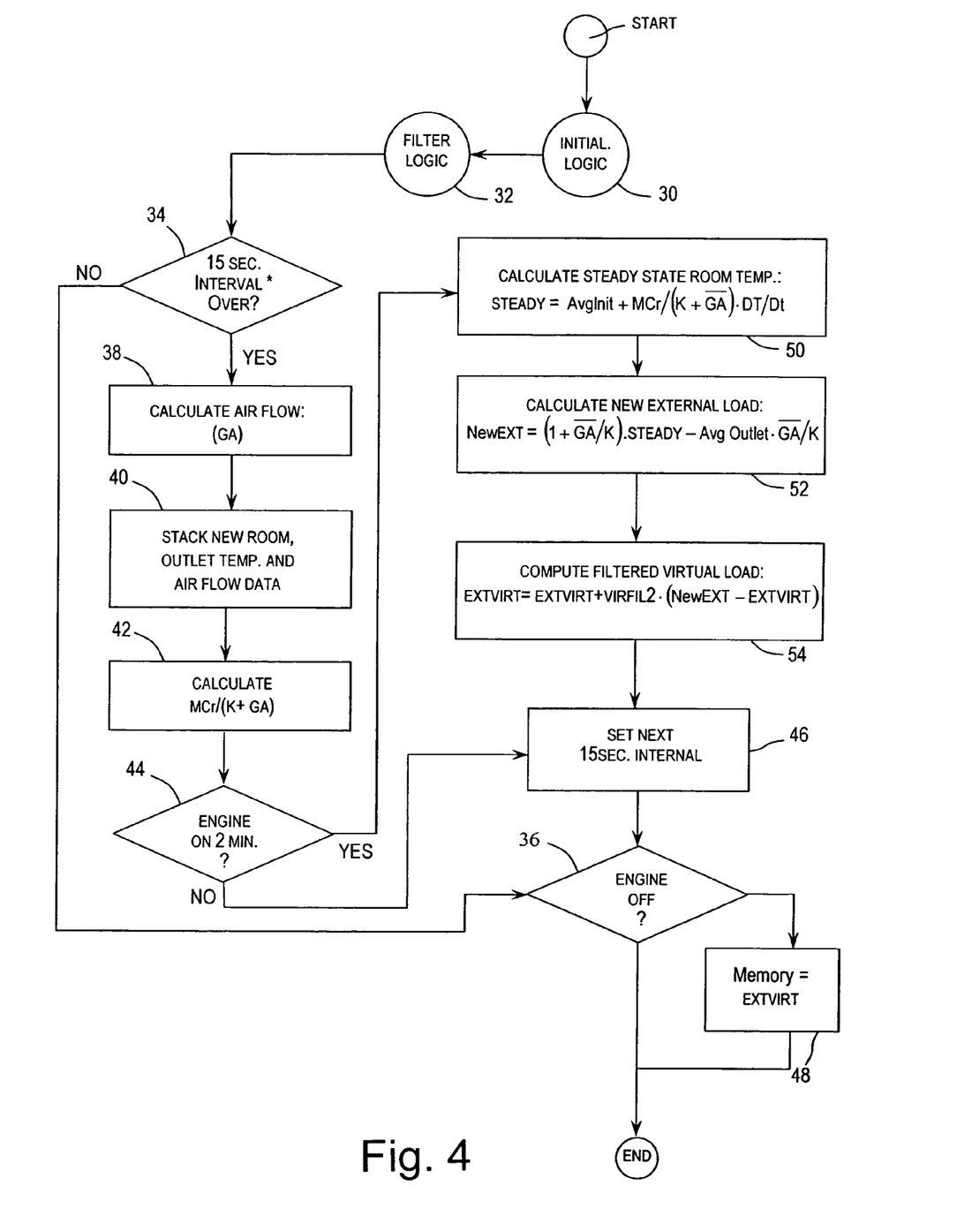
FIG. 4 is a flow chart illustrating the virtual external load logic carried out by the controller of the present invention.
Figure 6:
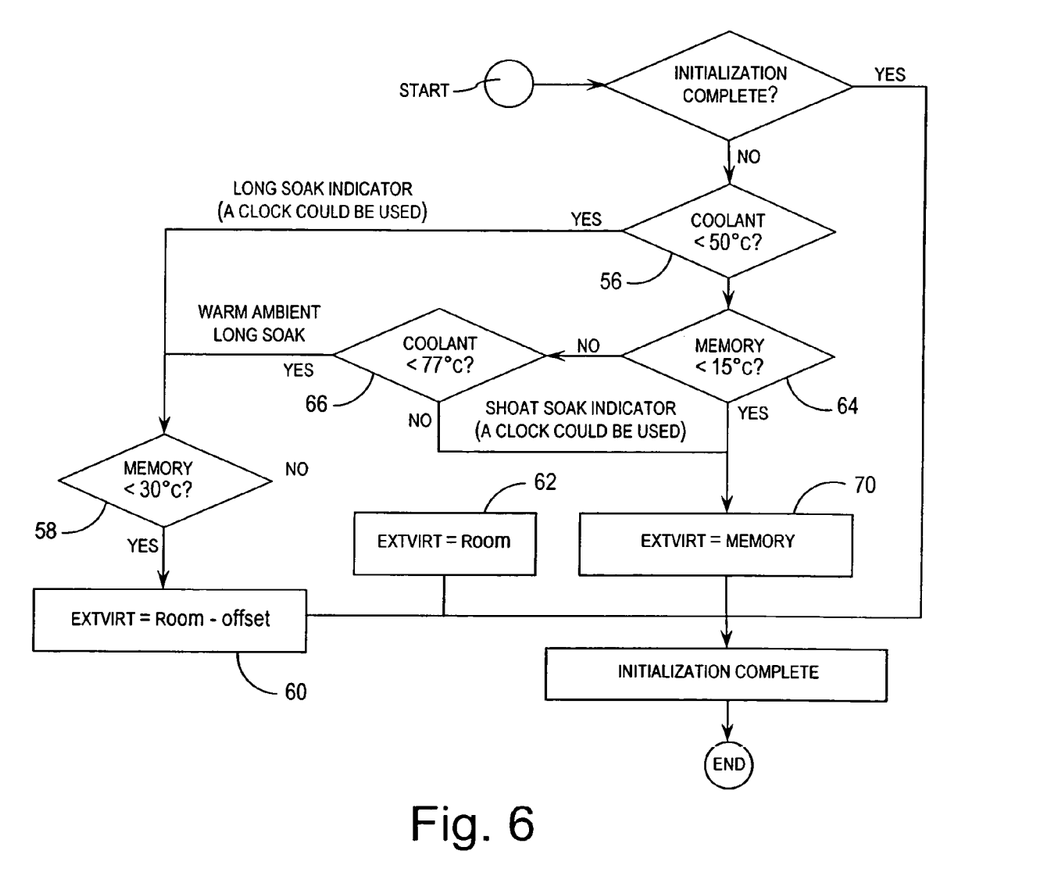
FIG. 6 is a flow chart illustrating the control logic for start-up conditions.

The initialization logic that is carried out at step 30 in the flow chart at FIG. 4 is illustrated in flow chart form in FIG. 6. Before the virtual external load logic can be carried out, the initialization routine proceeds to determine at step 56 whether the engine coolant is less than 50° C. If it is less than 50° C., which would indicate that the vehicle has been sitting for a long time after the engine was shut down following the previous mission. If the vehicle engine has indeed cooled down to a value less than 50° C., a determination at step 58 is made to determine whether the room temperature is less than 30° C. If it is less than 30° C., that would indicate that the vehicle, on initial start-up, has not been soaking in the sun. The routine then will proceed to action block 60 where the value for EXTVIRT stored in memory is equal to room temperature minus an offset of a predetermined value such as 5°. Thus, a lower passenger compartment temperature is used in the load calculation to provide a more gentle response. If the temperature on initial start-up is over 30° Centigrade, that indicates that the vehicle has been soaking in the sun and has accumulated a sun load. Under those conditions, the stored value for EXTVIRT is chosen as shown at action block 62. Thus, this portion of the routine is a long soak indicator.

If the engine coolant is greater than 50° Centigrade, that indicates that the engine has not been shut down for a long time. In that event, the routine will proceed to step 64 where the memory is accessed to obtain the stored value for temperature. If the memory value stored at the end of the execution of the preceding logic is greater than 15° C., a test is then made at step 66 to determine whether the coolant temperature is less than 77° C. If the coolant temperature is less than 77° C., the routine then will proceed to step 58. If the engine coolant temperature is higher than 77° C., the routine will use the value for EXTVIRT stored in memory in the load logic. This is indicated at 70.

If the room temperature is higher than 30° Centigrade, the value for EXTVIRT is the same as the measured interior temperature $T_r$, that value then is used in the previous external load logic routine as shown in FIG. 4. As indicated in the foregoing description of FIG. 6, it is determined at the outset of the routine of FIG. 6 whether the vehicle has been soaking for a long time or a short time. This information affects the sequence of the method steps illustrated in FIG. 6.

Figure 7:
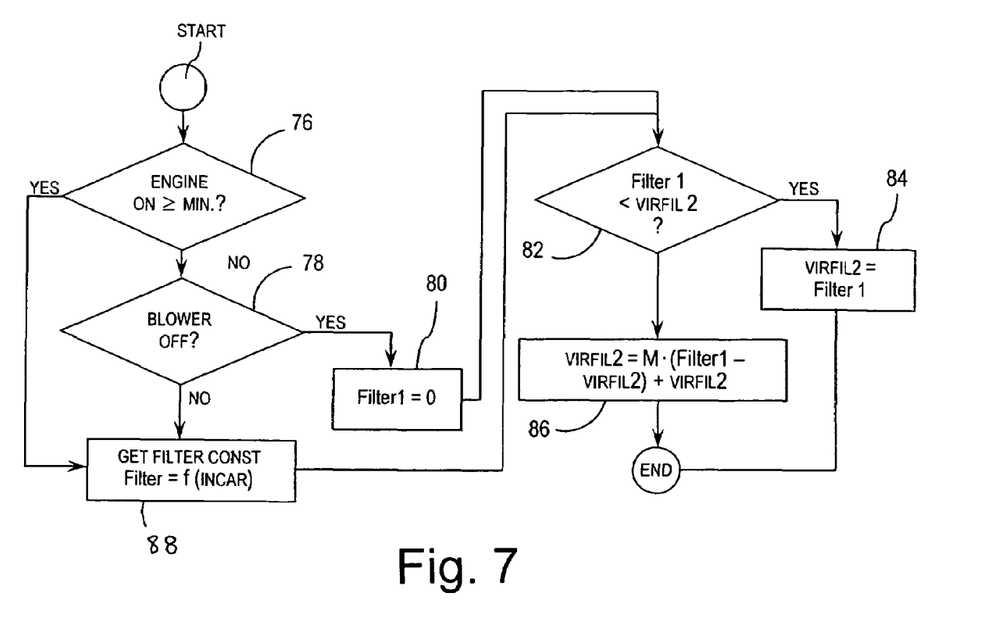
FIG. 7 is a flow chart illustrating a filter logic for dealing with unwanted fluctuations of the external virtual conditions that are due to improper responses of interior temperature sensors to changing actual room temperature.

The filter constant logic for EXTVIRT is shown in FIG. 7. This logic is used at the beginning of the routine shown in FIG. 4. A test is made at step 76 to determine whether the engine has been running for at least two minutes. As in the case of the other time intervals, a period of two minutes is an arbitrary value established by engineering judgment and empirical data obtained by test. This time period gives the system sufficient time to gather data to carry out the load logic calculations. It takes one minute, for example, to obtain the average interior temperature, outlet temperature and airflow value stacked in the memory registers indicated in FIG. 5. It also provides the engine sufficient time to develop warm water for use by the climate control system 10.

If the engine has not been running for two minutes, a test is made to determine whether the blower component 20 is on or off as shown at 78. If the blower component 20 is off, the routine at action block 80 will set the filter constant Filter1=0 in the computation at action block 54 in the external load logic computation routine of FIG. 4. A test is made then at step 82 to compare filter constant Filter1 with the virtual filter constant VIRFIL2. Since Filter1 is zero, a positive response at step 82 will require that the comparison between the two filter constants at action block 84 will be the same. Thus, both the filter constants would be zero and the external load logic then will proceed as indicated in FIG. 6. If Filter1 is greater than VIRFIL2, the routine will proceed to action block 86 where a calculation is made to make sure that VIRFIL2 increases in value so that it will match Filter1. This is done using the equation $$VIRFIL2 = M \cdot (Filter1 - VIRFIL2) + VIRFIL2$$

where M is a multiplier between 0 and 1.

The filter constants are obtained at action block 88 in FIG. 7 and compared at action block 82. These values for filter constants, which are obtained from a look-up table stored in ROM, are based on interior temperature $T_r$. Such look-up tables are well known in the art. An example of such a look-up table is shown in U.S. Pat. No. 5,995,889 (FIG. 7). If the duration of the filter constant response is short, the value for VIRFIL2 will rise until it matches Filter1. The gradual increase in VIRFIL2 is due to multiplier M. The same is true if the response time is long. If the filter constant from the look-up table (Filter1) should decrease below VIRFIL2, VIRFIL2 will immediately decrease without a gradual response.

Of course, it will be apparent to those skilled in the art from this disclosure that certain action blocks and/or logic from FIGS. 4-7 could be omitted in view of the improvements provided by the present invention as illustrated in the control logic of FIG. 3, if needed and/or desired.

Referring now to FIG. 11, the vehicle V equipped with a dual zone automatic climate control system 10' in accordance with the present invention will now be explained. The dual zone climate control system 10' basically includes a controller 12, an external temperature sensor 14, a sun load sensor component 16', an internal temperature sensor component 18', a blower component 20', a mass airflow determination component 22', an outlet temperature sensor component 24' and the refrigerant circuit 26. The sun load sensor component 16' includes driver and passenger side sun load sensor elements 17d and 17p. The internal temperature sensor component 18' includes driver and passenger side internal temperature sensor elements 19d and 19p. The blower component 20' includes driver and passenger side blower elements 21d and 21p. The mass airflow determination component 22' includes driver and passenger side mass airflow determination elements 23d and 23p and an outlet temperature sensor component 24' includes driver and passenger side outlet temperature sensor elements 25d and 25p.

In this system, the sun load sensor elements 17d and 17p obtain readings for the measured driver and passenger side sun loads $q_{sun(d)}$ and $q_{sun(p)}$, respectively. These readings are averaged to obtain a measured sun load ASL that is an average of the measured sun loads $q_{sun(d)}$ and $q_{sun(p)}$, as mentioned above. Similarly, the driver and passenger side internal temperature sensor elements 19d and 19p provide driver and passenger room temperatures $T_{rd}$ and $T_{rp}$, respectively, the driver and passenger side blower elements 21d and 21p expel driver and passenger air into the passenger compartment 11, respectively, the driver and passenger side mass airflow determination elements 23d and 23p measure the driver and passenger airflow $GA_d$ and $GA_p$, respectively, and the driver and passenger side outlet temperature sensor elements 25d and 25p provide driver and passenger side outlet temperatures $T_{od}$ and $T_{op}$, respectively.

Then the control logic of FIG. 3 is applied to each side of the passenger compartment 11 using the controller 12 and the data obtained from respective driver and passenger side internal temperature sensor elements 19d and 19p, and driver and passenger side mass airflow determination elements 23d and 23p to control the driver and passenger side blower elements 21d and 21p. Preferably, rather than using the measured sun load ASL (i.e. the average of the driver and passenger side sun loads $q_{sun(d)}$ and $q_{sun(p)}$) or the sun loads $q_{sun(d)}$ and $q_{sun(p)}$ themselves in the computations, these values are be weighted based on their variance from the measured sun load ASL to obtain driver and passenger sun load (factors) heat flux values Qsd and Qsp that emphasize/deemphasize the variance therebetween as mentioned above. However, it will be apparent to those skilled in the art from this disclosure that the driver and passenger side sun loads $q_{sun(d)}$ and $q_{sun(p)}$ themselves can be used or the measured sun load ASL can be used in the computations to control the blower elements 21d and 21p and the refrigerant circuit 26, if needed and/or desired.

In order to obtain driver and passenger sun load (factors) heat flux values Qsd and Qsp that emphasize/deemphasize the variance therebetween, weighting factors SunD and SunP are first determined where SunD=$q_{sun(d)}$−ASL and SunP=$q_{sun(p)}$−ASL. Here ASL is the average of the driver and passenger side sun loads $q_{sun(d)}$ and $q_{sun(p)}$. In this case, these weighting factors SunD and SunP are then applied (added) to the optimized thermal sun load TSL to obtain driver and passenger sun load factors Qsd and Qsp, respectively. Thus, Qsd=SunD+TSL and Qsp=SunP+TSL. The driver and passenger sun load factors Qsd and Qsp are corrected (adjusted) inputs that replace the sensor inputs and functionally replace the conventional sun sensor inputs to the control logic.

In any case, each of the blower elements 21d and 21p is controlled in a manner identical to the blower component 20 of the single zone climate control system 10, discussed above. The refrigerant circuit 26 is also regulated in order to regulate (control the outlet air temperature of the climate control system 10'. Since a single refrigerant circuit 26 is used for both zones of the climate control system 10' optimized cycling of the compressor $26^{cp}$ is preferably determined using an average of the various computed values for the two zones. In other words, the dual zone system is basically a duplication (or splitting) of the single zone system, where each side has a one-half of the GL. Thus, the controller 12 basically has a pair of control logics as illustrated in FIG. 3 running simultaneously to control the climate on both sides of the passenger compartment 11. Other simple modifications (i.e. utilizing the principles of a single zone climate control system in a dual zone climate control system) are well known to those skilled in the art. Thus, the dual zone climate control system 10' will not be explained and/or illustrated in detail herein.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An automatic climate control system for a vehicle comprising:
   a cabin air regulating structure configured to regulate airflow into a passenger compartment of the vehicle;
   a sun load sensor component configured to measure actual sun load;
   an external temperature sensor component configured to determine external air temperature; and
   a controller configured to control the cabin air regulating component based on an optimized sun load value to maintain a desired cabin temperature,
   the controller being configured to compare the actual sun load to a virtual sun load that is a variable calculated based on prescribed heat load data and the external air temperature, and to determine the optimized sun load value based on the comparison of the actual sun load to the virtual sun load.

2. The automatic climate control system according to claim 1, wherein
   the controller is further configured to calculate the optimized sun load value using the virtual sun load when the sun load sensor component receives daylight and when the virtual sun load is larger than the actual sun load.

3. The automatic climate control system according to claim 2, wherein
   the controller is further configured to set the optimized sun load value to the actual sun load when the sun load sensor component receives daylight and when the actual sun load is larger than the virtual sun load.

4. The automatic climate control system according to claim 3, wherein
   the controller is further configured to set the optimized sun load value to the actual sun load when the sun load sensor component does not receive daylight.

5. The automatic climate control system according to claim 3, wherein
   the controller is further configured to determine the virtual sun load by subtracting the external air temperature from a virtual heat load value determined using the prescribed virtual heat load data.

6. The automatic climate control system according to claim 5, wherein
   the virtual heat load value is determined using internal air temperature data and mass airflow data in the passenger compartment.

7. The automatic climate control system according to claim 2, wherein
   the controller is further configured to use a weighted value of the virtual sun load to obtain the optimized sun load value when the sun load sensor component receives daylight and when the virtual sun load is larger than the actual sun load.

8. The automatic climate control system according to claim 7, wherein
   the controller is further configured to use the weighted value of the virtual sun load and a weighted value of the actual sun load to obtain the optimized sun load value when the sun load sensor component receives daylight and when the virtual sun load is larger than the actual sun load.

9. The automatic climate control system according to claim 1, wherein
   the controller is further configured to set the optimized sun load value to the actual sun load when the sun load sensor component receives daylight and when the actual sun load is larger than the virtual sun load.

10. The automatic climate control system according to claim 1, wherein the controller is further configured to set the optimized sun load value to the actual sun load when the sun load sensor component does not receive daylight.

11. The automatic climate control system according to claim 1, wherein the sun load sensor component includes at least two sun load sensor elements to determine at least two separate actual sun load factors;

the cabin air regulating structure includes at least two blower elements to blow air into at least two zones of the passenger compartment of the vehicle corresponding to areas adjacent to the at least two sun load sensor elements, respectively; and the controller is further configured to compare each of the actual sun load factors to the virtual sun load to control the cabin air regulating structure to maintain a desired temperature for each of the zones of the passenger compartment.

12. The automatic climate control system according to claim 1, wherein the cabin air regulating structure includes a blower component, and the controller is further configured to determine an optimal blower speed for the blower component to maintain the desired cabin temperature.

13. The automatic climate control system according to claim 12, wherein the cabin air regulating structure includes a compressor component, and the controller is further configured to determine an optimal cycling for the compressor component to maintain the desired cabin temperature.

14. The automatic climate control system according to claim 1, wherein the cabin air regulating structure includes an air blending component, and the controller is further configured to determine an optimal air blending amount for the air blending component to maintain the desired cabin temperature.

15. The automatic climate control system according to claim 1, wherein the controller is further configured to calculate the optimized sun load value using the virtual sun load and the actual sun load in the calculation when the sun load sensor component receives daylight and when the virtual sun load is larger than the actual sun load.

16. A automatic climate control system comprising:

a cabin air regulating structure configured to regulate airflow into a passenger compartment of the vehicle;

a sun load sensor component configured to measure actual sun load;

an external temperature sensor component configured to determine external air temperature; and a controller configured to compare the actual sun load to a virtual sun load based on prescribed virtual heat load data and the external air temperature to obtain an optimized sun load value, and to control the cabin air regulating component based on the optimized sun load value to maintain a desired cabin temperature, the controller being further configured to determine the virtual sun load by subtracting the external air temperature from a virtual heat load value determined using the prescribed virtual heat load data.

17. The automatic climate control system according to claim 16, further comprising a mass airflow determination component configured to determine mass airflow expelled into the passenger compartment by the cabin air regulating structure; and a cabin temperature sensor component configured to determine ambient internal cabin temperature, with the virtual heat load value being determined using the prescribed heat load data, the internal air temperature determined by the cabin temperature sensor component and the mass airflow determined by the mass airflow determination component.

18. The automatic climate control system according to claim 16, wherein the controller is further configured to use the virtual sun load to obtain the optimized sun load value when the sun load sensor component receives daylight and when the virtual sun load is larger than the actual sun load.

19. The automatic climate control system according to claim 18, wherein the controller is further configured the optimized sun load value when the sun load sensor component receives daylight and when the actual sun load is larger than the virtual sun load.

20. The automatic climate control system according to claim 19, wherein the virtual heat load value is determined using internal air temperature data and mass airflow data in the passenger compartment.

21. The automatic climate control system according to claim 16, wherein the virtual heat load value is determined using internal air temperature data and mass airflow data in the passenger compartment.

22. A method for automatically controlling the climate in a passenger compartment of a vehicle comprising:

measuring actual sun load;

determining external air temperature;

calculating a virtual sun load based on prescribed virtual heat load data and the external air temperature;

comparing the actual sun load to the virtual sun load;

determining an optimized sun load value based on the comparison of the actual sun load to the virtual sun load; and controlling a cabin air regulating structure based on the optimized sun load value.

23. The method according to claim 22, wherein the optimized sun load value is determined by a calculation using the virtual sun load when in a daylight condition and when the virtual sun load is larger than the actual sun load.

24. The method according to claim 23, wherein the optimized sun load value is determined to be the actual sun load in a daylight condition when the actual sun load is larger than the virtual sun load.

25. The method according to claim 24, wherein the optimized sun load value is determined to be the actual sun load in a non-daylight condition.

26. The method according to claim 23, wherein a weighted value of the virtual sun load is used to determine the optimized sun load value when in a daylight condition and when the virtual sun load is larger than the actual sun load.

27. The method according to claim 26, wherein the weighted value of the virtual sun load and a weighted value of the actual sun load are used to determine the optimized sun load value when in a daylight condition and when the virtual sun load is larger than the actual sun load.

28. The method according to claim 22, wherein the optimized sun load value is determined to be the actual sun load in a daylight condition when the actual sun load is larger than the virtual sun load.

29. The method according to claim 22, wherein the optimized sun load value is determined to be the actual sun load in a non-daylight condition.

30. The method according to claim 22, wherein the measuring of the actual sun load includes determining at least two separate actual sun load factors;
the comparing the actual sun load to the virtual sun load includes comparing each of the actual sun load factors to the virtual sun load to obtain at least two optimized sun load values for at least two zones of the passenger compartment; and
the controlling of the cabin air regulating structure includes controlling at least two blower elements of the cabin air regulating structure based on the at least two optimized sun load values.

31. The method according to claim 22, wherein the controlling of the cabin air regulating structure includes controlling a blower component of the cabin air regulating structure based on the optimized sun load value.

32. The method according to claim 22, wherein the controlling of the cabin air regulating structure includes controlling a compressor component of the cabin air regulating structure based on the optimized sun load value.

33. The method according to claim 22, wherein the controlling of the cabin air regulating structure includes controlling an air blending component of the cabin air regulating structure based on the optimized sun load value.

34. A method for automatically controlling the climate in a passenger compartment of a vehicle comprising:
measuring actual sun load;
determining external air temperature;
comparing the actual sun load to a virtual sun load based on prescribed virtual heat load data and the external air temperature to obtain an optimized sun load value; and
controlling a cabin air regulating structure based on the optimized sun load value,
the virtual sun load being determined by subtracting the external air temperature from a virtual heat load value determined using the prescribed virtual heat load data.

35. The method according to claim 34, further comprising determining mass airflow expelled into the passenger compartment by the cabin air regulating structure; and
determining ambient internal cabin temperature, with the virtual heat load value being determined using the prescribed heat load data, the internal air temperature and the mass airflow.

36. An automatic climate control system for a vehicle comprising:
a cabin air regulating structure configured to regulate airflow into a passenger compartment of the vehicle;
a sun load sensor component configured to measure actual sun load;
an external temperature sensor component configured to determine external air temperature; and
a controller configured to control the cabin air regulating component based on an optimized sun load value to maintain a desired cabin temperature,
the controller being configured to set the optimized sun load value to the actual sun load when the actual sun load is less than a predetermined threshold value, and to set the optimized sun load value based on a comparison of the actual sun load to a virtual sun load when the actual sun load is at least as large as the predetermined threshold value.

37. The automatic climate control system according to claim 36, wherein
the controller is further configured to set the optimized sun load value to the actual sun load when the actual sun load is determined to be at least as large as the virtual sun load in the comparison; and
the controller is further configured to calculate the optimized sun load value using the virtual sun load and the actual sun load when the actual sun load is smaller than the virtual sun load in the comparison.

38. A method for automatically controlling the climate in a passenger compartment of a vehicle comprising:
measuring actual sun load;
determining external air temperature;
determining a virtual sun load;
setting an optimized sun load value to the actual sun load when the actual sun load is less than a predetermined threshold value, and setting the optimized sun load value based on a comparison of the actual sun load to the virtual sun load when the actual sun load is at least as large as the predetermined threshold value; and
controlling a cabin air regulating structure based on the set optimized sun load value.

39. The method according to claim 38, wherein
the optimized sun load value is set to the actual sun load when the actual sun load is determined to be at least as large as the virtual sun load in the comparison; and
the optimized sun load is set using a calculation that uses the virtual sun load and the actual sun load when the actual sun load is smaller than the virtual sun load in the comparison.

* * * * *